United States Patent [19]

Rebling et al.

[11] 3,919,233

[45] Nov. 11, 1975

[54] CYCLIC UREA DERIVATIVES AND SALTS THEREOF

[75] Inventors: Rolf Rebling, Bielefeld; Klaus Pressler, Hoberge/Uerentrup; Jurgen Potel, Gadderbaum, all of Germany

[73] Assignee: Asta-Werke Aktiengesellschaft Chemische Fabrik, Westfalen, Germany

[22] Filed: Oct. 3, 1972

[21] Appl. No.: 294,623

[30] Foreign Application Priority Data
Oct. 9, 1971 Germany.......................... 2150438

[52] U.S. Cl.... 260/268 C; 260/239 B; 260/239 BC; 260/247.2 R; 260/247.2 B; 260/268.14; 260/309.7; 424/244; 424/250; 424/251
[51] Int. Cl.².................................. C07D 295/16
[58] Field of Search..... 260/268 C, 268 H, 256.4 C, 260/239 BC, 239 B

[56] References Cited
UNITED STATES PATENTS
3,374,237   3/1968   Wright et al................. 260/268 H 3,812,128   5/1974   Zust et al....................... 260/268 H

*Primary Examiner*—Richard J. Gallagher
*Assistant Examiner*—Mary C. Vaughn
*Attorney, Agent, or Firm*—McNenny, Farrington, Pearne & Gordon

[57] ABSTRACT

The present invention is related to certain new basically substituted cyclic urea derivatives having the general formula I

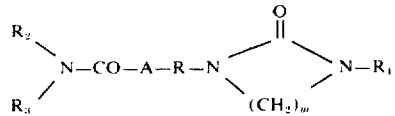

and salts thereof with pharmacologically acceptable acids. The invention furthermore is related to processes for the production thereof. The new compounds of formula I are useful as antiviral agents.

5 Claims, No Drawings

CYCLIC UREA DERIVATIVES AND SALTS THEREOF

The present invention is related to new basically substituted cyclic urea derivatives having the general formula I

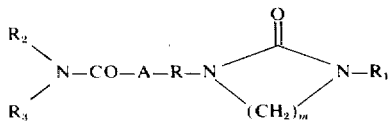

wherein m is 2 or 3, R is a straight or branched alkylene group having from 2 to 4 carbon atoms, $R_1$ is a saturated or unsaturated, straight or branched aliphatic hydrocarbon group having from 1 to 18 carbon atoms, $R_2$ and $R_3$, which may be the same or different from each other, represent hydrogen or alkyl groups having from 1 to 4 carbon atoms or $R_2$ and $R_3$ together with the nitrogen atom, to which they are attached, represent a pyrrolidine, piperdine, homopiperidine or morpholine group, and A is a piperazine, 1,4-diazacycloheptane, 1,4-diazacyclooctane or 1,5-diazacyclooctane group, each of these groups being bound to the neighboring atoms by way of their two nitrogen atoms, or A is the radical of an aliphatic diamine of the formula

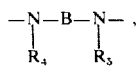

B being a polymethylene group having 2 or 3 carbon atoms and $R_4$ and $R_5$ each representing hydrogen or a lower alkyl group having from 1 to 4 carbon atoms, preferably a methyl group. The present invention further is related to the salts of the compounds of formula I with pharmacologically acceptable acids.

The piperazine group may be substituted with one or several, preferably 1 or 2 methyl and/or ethyl groups. Preferably it is unsubstituted as the other groups A.

The process for the production of the new compounds of the general formula I and the salts thereof is characterized in that equivalent amounts of the compounds of the following general formulas II, III, IV and V

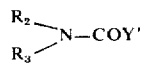

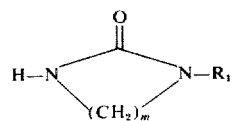

wherein X is the radical of a reactive ester, preferably a halogen atom or a sulfonic acid ester group, Y' is a halogen atom, a lower alkoxy or the phenoxy group, preferably a halogen atom, and m, R, $R_1$, $R_2$, $R_3$ and A have the same meaning as in formula I, are stepwise reacted with each other in the presence of an inert solvent and possibly of an alkaline condensation agent at an elevated temperature, and, if desired, converting compounds of formula I into an acid addition salt with a pharmaceutically acceptable acid or converting a salt of a compound of formula I into the corresponding free base of formula I.

Thus, the compounds of formula II and III may be reacted to yield the compound of the general formula VI

compound IV and compound V are reacted to yield the compound of the general formula VII

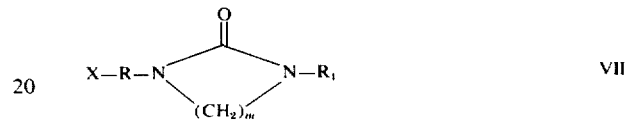

and these compounds VI and VII then are reacted to yield the compounds of formula I. In the same manner, compound IV may be reacted with compound V to yield a compound of the above formula VII, which then is reacted with compound III to yield the compound of the general formula VIII

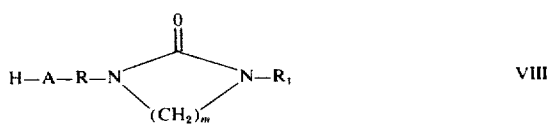

which then is reacted with compound II to the compounds of the general formula I. Still furthermore, compound II may be reacted with compound III to yield the compound of the above formula which then is reacted with compound IV to yield the compounds of the general formula IX

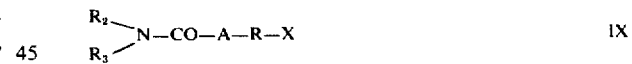

which then is reacted with compound V to yield the compounds of the general formula I. Still furthermore, compounds III and IV may be reacted to the compound of the general formula X

which is either reacted with compound II to compound IX which again is reacted with compound V to yield the compounds of the general formula I or compound X is reacted with compound V to yield the above compound VIII which then is reacted with compound II to yield the compounds of the general formula I. The sequence at which the various starting compounds II, III, IV and V of the present process are reacted with each other is of no importance. Always three steps are necessary for the production of the compounds of the general formula I from these four starting products. The process of the present invention is preferably carried out in the presence of an organic inert solvent. Useful organic inert solvents are for instance ethers such as dioxane or aromatic hydrocarbons such as benzene, toluene or xylene depending upon the temperature the reaction is to be carried out. Suitable basic condensation agents are preferably tertiary amines or alkali compounds such as potassium carbonate or sodium hydride or sodium amide. Particularly preferred is triethylamine. One may produce salts, such as alkali salts of starting products such as those of formula V by reaction with an alkali metal amide or hydride. In some instances, one may also proceed without the addition of a condensation agent, in particular in connection with the last step of the reaction, thus yielding directly the respective salt of the compounds of the general formula I. The process according to the present invention is carried out at an elevated temperature, in particular at the boiling point of the reaction mixture. Preferably, the reaction is effected with equimolar amounts of the components in the various steps of the present process.

In the reactions starting with a compound III wherein A is a cyclic group, this compound preferably is a compound wherein one nitrogen atome is substituted by a protective group which may be readily split off, in particular a carbalkoxy group, in order to obtain the intermediary products VI, VIII or, respectively, X as pure as possible and in as high a yield as possible. The resulting product then is subjected to an alkaline hydrolysis, for instance with a potassium hydroxide solution in ethanol.

Thus, the starting products of the general formula III may be obtained from mono-N-carbalkoxy-piperazines and a possibly substituted carbamic acid chloride and subjecting the resulting reaction product to an alkaline hydrolysis by means of an alcoholic solution of potassium hydroxide.

With compounds wherein A represents an aliphatic diamine group one may proceed as follows: for instance a compound of the general formula III is subjected to reaction with an excess (four times of the calculated amount) of an alkylene diamine thus yielding the desired intermediary compounds in good yields.

The intermediary products of the general formula IX may for instance also be obtained by subjecting the compound of the general formula VI to reaction with ethylene oxide and exchanging the hydroxy group in the resulting β-hydroxyethylene compound with a halogen atom or a sulfonic acid ester group by manners known per se.

The compounds of the general formula I may be obtained as free bases or as physiologically acceptable acid addition salts such as hydrochlorides, maleinates or citrates.

The compounds of the general formula I produce antimykotic and antiviral effectiveness and show at the same time a very low toxicity and a very good compatibility. As antivirally effective compounds they may be used against DNS and RNS viruses in humans and animals. For this purpose they are either administered orally or parenterally, in the form of dragees, tablets, capsules, ointments, sprays or the like. In comparison to known compounds the compounds according to the present invention are characterized by an effectiveness at the same time against DNS and RNS viruses. Furthermore, they may be successfully used both before the infection with the viruses as well as after the infection therewith.

A compound may be tested for its antiviral effectiveness on tissue cultures and on test animals. Both test methods have been used and the results with the compounds of the general formula I are given in the column "virus inhibition" of the following table 1, namely:

1. Plaque test in the tissue culture when infecting the fibroplast tissue of chicken embryo with viruses of the atypic chicken pests (NDV);
2. Inhibition of illness after infection of mice with influenza viruses.

Table 1

$$R_2\diagdown N-CO-A-R-N\diagup\diagdown(CH_2)_m\diagup N-R_1 \quad xHCl$$
$$R_3\diagup$$

| Example No. | $R_1$ | $R_2$ | $R_3$ | A | R | m | melting point (°C.) | virus inhibition* in tissue culture against NDV-virus | test in mice against influenza virus |
|---|---|---|---|---|---|---|---|---|---|
| 8.u. 13 | $CH_3-$ | $C_2H_5-$ | $C_2H_5-$ | $-N\underset{\smile}{\frown}N-$ | $-(CH_2)_2-$ | 2 | 184–185 | ++ | ++ |
| 9 | $n-C_6H_{13}-$ | $C_2H_5-$ | $C_2H_5-$ | $-N\underset{\smile}{\frown}N-$ | $-(CH_2)_2-$ | 2 | 176–179 | (+) | + |
| 10 | $n-C_8H_{17}-$ | $C_2H_5-$ | $C_2H_5-$ | $-N\underset{\smile}{\frown}N-$ | $-(CH_2)_2-$ | 2 | 173–176 | + | (+) |
| 5 | $n-C_{10}H_{21}-$ | $C_2H_5-$ | $C_2H_5-$ | $-N\underset{\smile}{\frown}N-$ | $-(CH_2)_2-$ | 2 | 167–169 | ++ | ++ |
| 4 | $n-C_{12}H_{25}-$ | $C_2H_5-$ | $C_2H_5-$ | $-N\underset{\smile}{\frown}N-$ | $-(CH_2)_2-$ | 2 | 165–168 | + | (+) |
| 1 u. 2 | $n-C_{14}H_{29}-$ | $C_2H_5-$ | $C_2H_5-$ | $-N\underset{\smile}{\frown}N-$ | $-(CH_2)_2-$ | 2 | 162–165 | ++ | ++ |
| 3 | $n-C_{14}H_{29}-$ | $C_2H_5-$ | $C_2H_5-$ | $-N\underset{\smile}{\frown}N-$ | $-(CH_2)_3-$ | 2 | 162–169 | (+) | ++ |
| 7 | $n-C_{14}H_{29}-$ | $n-C_3H_7-$ | $n-C_3H_7-$ | $-N\underset{\smile}{\frown}N-$ | $-(CH_2)_2-$ | 2 | 131–136 | + | + |
| 6 | $n-C_{16}H_{33}-$ | $C_2H_5-$ | $C_2H_5-$ | $-N\underset{\smile}{\frown}N-$ | $-(CH_2)_2-$ | 2 | 160–164 | + | ++ |
| 11 | $CH_3-$ | $C_2H_5-$ | $C_2H_5-$ | $-N\underset{\smile}{\frown}N-$ | $-(CH_2)_4-$ | 3 | 179–180 | + | + |

Table 1-continued $$R_2\diagdown N-CO-A-R-N\diagup\diagdown N-R_1 \quad xHCl$$
(with ketone O on piperazinone ring, (CH₂)ₘ)

| Example No. | R₁ | R₂ | R₃ | A | R | m | melting point (°C.) | virus inhibition*) in tissue culture against NDV-virus | test in mice against influenza virus |
|---|---|---|---|---|---|---|---|---|---|
| 12 | n—C₁₄H₂₉— | CH₃— | CH₃— | —N⌒N— | —(CH₂)₂— | 2 | 145–148 | + | (+) |
| 14 | CH₃— | C₂H₅— | C₂H₅— | —N⌒N— | —(CH₂)₂— | 2 | 145–147 | ++ | (+) |
| 17 | CH₃— | C₂H₅— | C₂H₅— | —N⌒N— | —(CH₂)₄— | 2 | 124–126 | ++ | + |
| 18 | CH₃— | C₂H₅— | C₂H₅— | —N⌒N— | —CH₂—C(CH₃)H— | 2 | 147–148 | + | (+) |
| 15 | n—C₁₄H₂₉— | (cyclohexyl) | | —N⌒N— | —(CH₂)₂— | 2 | 185–187 | (+) | (+) |
| 16 | n—C₁₄H₂₉— | (pyrrolidinyl) | | —N⌒N— | —(CH₂)₂— | 2 | 190–192 | + | + |

*) 0 = no inhibition
++ = strong inhibition

Hereinafter the results of tests for the virus growth inhibiting effectiveness of 1-[2-(1-diethylcarbamoyl-4-piperazinyl)-ethyl]-3-n-tetradecyl-2-imidazolidinone hydrochloride (Examples 1 and 2) are given:

1. Inhibition of viruses in the tissue culture plaque test. Addition of the diluted solutions of the test compound (in base form) after the infection of the tissue with virus, at the times given in the table. Removal of the test compound by change of the nutrition solution after 3 to 4 hours.

| | % of the plaques caused by viruses (average value) | | | | | | | | |
|---|---|---|---|---|---|---|---|---|---|
| | Herpes virus (DNS virus) | | | | | Coxsackie virus (RNS virus) | | | |
| | simulta- neously | 1hr | 2hr | 3hr | 4hr | simulta- neously | 1hr | 2hr | 3hr |
| Control | 75 | 57 | 75 | 81 | 100 | 100 | 95 | 100 | 100 |
| 1 γ/ml | 5 | 18 | 32 | 31 | 44 | ./. | 19 | 6 | 30 |
| 2 γ/ml | 15 | 4 | 10 | 9 | ./. | ./. | 13 | ./. | 6 |

2. Effectiveness against influenza virus infection (A₂/-Hongkong virus, RNS virus) in mice. Dosage: 10 mg./kg. (in the base form). Percentage of protection dtermined by dividing the protective index K by the LD (50) [ID (50)] of the control test.

| Simultaneously | | 2 hr. after infection | | 4 hr. after infection | |
|---|---|---|---|---|---|
| LD(50) | ID(50) | LD(50) | ID(50) | LD(50) | ID(50) |
| 44 % | 33 % | 33 % | 25 % | 33 % | 16 % |

3. Local treatment of a vaccinia virus infection (DSN virus) of the skin in rabbits (two animals per test group). The treatment starts after full development of the pustules at the 9th day after infection by applying 0.005 % of the active compound daily once (9th to 13th day after infection).

| | Degree of blister formation (%) | | | | |
|---|---|---|---|---|---|
| Test day no. | 9 | 10 | 11 | 12 | 13 |
| Control group | 100 | 100 | 75 | 63 | 50 |
| Treated group | 100 | 63 | 50 | 38 | 12.5 |

The following examples further illustrate the production of the compounds of the general formula I as well as of intermediary products.

EXAMPLE 1 a) N-Diethylcarbamoyl-4-piperazine 226 g. (1.43 mole) of mono-N-carbethoxy piperazine and 144.5 g. (1.43 mole) of triethylamine are dissolved in 850 cc. of anhydrous dioxane. 194 g. (1.43 mole) of N,N-diethylcarbamic acid chloride are added thereto dropwise within 2 hours with stirring and cooling. The reaction mixture then is stirred for another hour at room temperature and for 2 hours with refluxing. The reaction mixture is cooled and the precipitated triethylamine hydrochloride is filtered off with suction, the filter cake is washed with dioxane and the combined filtrates are evaporated. The resulting residue is distilled in a vacuum. Thus, N-carbethoxy-N'-(diethylcarbamoyl)-piperazine (B.p./0.2 mm: 153° to 155° C.) is obtained. This compound is heated to boiling with stirring for 15 hours in a solution of 177 g. of KOH in 1000 cc. of anhydrous ethanol. The reaction mixture is cooled, the precipitated potassium carbonate is filtered off, the filter cake is washed with anhydrous ethanol and the combined filtrates are evaporated. The yellow residue is dissolved in 5 N soda lye and the resulting solution is extracted twice with ether. The ethereal solution is dried over anhydrous sodium sulfate, the solution is evaporated and the oily residue is fractionated twice in a high vacuum. Thus, 169.5 g. of N-(diethylcarbamoyl)piperazine (64 % of the theoretical) are obtained. B.p. 0.01 mm: 103° to 108° C.

b. 1-[2-(1-Diethylcarbamoyl-4-piperazinyl)-ethyl]-3-n-tetradecyl-2-imidazolidinone 57.5 g. (0.31 mole) of N-diethylcarbamoyl-piperazine, 106.9 g. (0.31 mole) of 1-n-tetradecyl-3-($\beta$-chloroethyl)-imidazolidone-(2) (produced by reacting equimolar amounts of 1-n-tetradecylimidazolidone-(2) and 1-chloro-2-bromo-ethane; or ethylene oxide with subsequent exchange of the $\beta$-hydroxy group against chlorine by subjection to reaction with thionyl chloride in chloroform), 31.4 g. (0.31 mole) of triethylamine and 300 cc. of dioxane are refluxed for 8 hours. The reaction mixture is cooled and the precipitated triethylamine hydrochloride is filtered off with suction and the filter cake is washed with dioxane. The combined filtrates are evaporated and the residue is dissolved in 400 cc. of methylene chloride. The solution is washed several times with 400 cc. of water each time and thereafter dried over anhydrous sodium sulfate. The solvent is evaporated. Thus, a dark oil is obtained. Yield in crude product: 134 g. (87.6 % of the theoretical). $n^{21}_D$: 1.4890.

133 g. (0.27 mole) of the above crude product are dissolved in anhydrous ether and the calculated amount of ethereal hydrochloric acid is added dropwise thereto, just until an acid reaction is obtained. Thus, the hydrochloride of 1-[2-(1-diethylcarbamoyl-4-piperazinyl)-ethyl]-3-n-tetradecyl-2-imidazolidinone is obtained. The precipitated hydrochloride is filtered off with suction and recrystallized from 360 cc. of a 5:1 mixture of acetone and alcohol. M.p.: 158° to 164° C. Yield: 83 g. (58 % of the theoretical).

A still further purified product is obtained by reconverting the hydrochloride into the base, dissolving the base in ether and subjecting this solution to a fractional precipitation of the hydrochloride by the addition of ethereal hydrochloric acid. The resulting hydrochloride is recrystallized from a 5:1 mixture of acetone and ethanol yielding into an hydrochloride having a melting point of 162° to 165° C.

EXAMPLE 2 a. 1-[2-(1-Piperazinyl)-ethyl]-3-n-tetradecyl-2-imidazolidinone 104 g. (0.3 mole) of 1-n-tetradecyl-3-($\beta$-chloroethyl)-imidazolidone-(2) (produced from 1-n-tetradecyl-imidazolidone-(2) and 1-chloro-2-bromo-ethane), 47.5 g. (0.3 mole) of monocarbethoxy piperazine and 30.5 g. (0.3 mole) of triethylamine are dissolved in 200 cc. of dioxane and the solution is refluxed with stirring for 8 hours. The precipitated salt (triethylamine hydrochloride) is filterd off with suction, the filtrate is evaporated, the residue is dissolved in a solution of 37 g. (0.66 mole) of potassium hydroxide in 200 cc. of anhydrous ethanol and the resulting solution is refluxed for 20 hours. The precipitated potassium carbonate is filtered off with suction and is discarded. The filtrate is evaporated and the residue is dissolved in methylene chloride. The solution is washed several times with water and is dried over anhydrous sodium sulfate. The sodium sulfate is filtered off and the solvent is again separated by distillation. A dark-brown fatty product is obtained (yield: 81 g.; 68.5 % of the theoretical) which may be purified by dissolving it in anhydrous ester and adding thereto ethereal hydrochloric acid with stirring and cooling until a weakly acid reaction is obtained. The precipitated soapy dihydrochloride salt is recrystallized from a mixture of acetone and ethanol. (Yield: 27.5 g.; 35 % of the theoretical; M.p. 176° to 250°C. with intermediary softening). The dihydrochloride is again converted into the base by the addition of 2N aqueous potassium hydroxide and the base is dissolved in methylene chloride. The solution is dried and the solvent is evaporated. Thus, 22.7 g. (98 % of the theoretical) of 1-[2-(1-piperazinyl)-ethyl]-3-n-tetradecyl-2-imidazolidinone is obtained.

b. 1-[2-(1-Diethylcarbamoyl-4-piperazinyl)-ethyl]-3-n-tetradecyl-2-imidazolidinone 39.5 g. (0.1 mole) of 1-[2-(1-piperazinyl)-ethyl]-3-n-tetradecyl-2-imidazolidinone obtained as above described and 11.1 g. (0.11 mole) of triethylamine are dissolved in 100 cc. of dioxane. 14.9 g. (0.11 mole) of diethylcarbamic acid chloride are added dropwise thereto. The reaction mixture then is refluxed for 6 hours. After cooling, the reaction mixture is poured into water which is extracted several times with ether. The combined ethereal extracts are washed several times with water and thereafter dried over sodium sulfate. The solvent then is distilled off, thus yielding into 40 g. of the crude base (80.9 % of the theoretical).

The corresponding hydrochloride is obtained by dissolving 39.5 g. (0.08 mole) of this crude base in anhydrous ether and adding dropwise thereto the calculated amount of ethereal hydrochloric acid until a weakly acid reaction is obtained. The precipitated hydrochloride is filtered off with suction and is recrystallized from a mixture of acetone and ethanol.

M.p.: 158° to 164° C. Yield: 18 g. (42.4 % of the theoretical).

EXAMPLE 3

1-[3-(1-Diethylcarbamoyl-4-piperazinyl)-propyl]-3-n-tetradecyl-2-imidazolidinone 18.0 g. (0.05 mole) of 1-n-tetradecyl-3-($\gamma$-chloropropyl)-imidazolidone-(2) (produced from 1-n-tetradecyl-imidazolidone and 1-chloro-3-bromo-propane) and 9.3 g. (0.05 mole) of N-diethylcarbamoyl piperzine are dissolved together with 5.1 g. (0.05 mole) of triethylamine in 50 cc. of dioxane and the solution is refluxed for 6 hours. After cooling, the reaction mixture is poured into water which is extracted twice with methylene chloride. The combined extracts are washed twice with water, dried over sodium sulfate and evaporated, finally under reduced pressure. Thus, 23.5 g. of the crude base (95 % of the theoretical) are obtained.

The corresponding hydrochloride is produced as follows: 23.4 g. (0.046 mole) of the oily crude base are dissolved in anhydrous ether and ethereal hydrochloric acid is added thereto with stirring and cooling until a weakly acid reaction is obtained. The precipitated salt is recrystallized twice from ethyl acetate. Thus 10 g. (40.0 % of the theoretical) of 1-[3-(1-diethylcarbamoyl-4-piperazinyl)-propyl]-3-n-tetradecyl-2-imidazolidinone hydrochloride are obtained. M.p.: 162° to 169° C.

The following compounds have been produced in the same manner:

1-[2-(1-Morpholinocarbonyl-4-piperazinyl)-ethyl]-3-n-tetradecyl-2-imidazolidinone hydrochloride;
M.p.: 182° to 188° C.

1-[2-(1-Diethylcarbamoyl-4-piperazinyl)-ethyl]-3-allyl-2-imidazolidinone hydrochloride;
M.p.: 167° to 169° C.

1-[2-(1-Diethylcarbamoyl-4-piperazinyl)-ethyl]-3-oleyl-2-imidazolidinone hydrochloride;
M.p.: 155° to 158° C.

1-[2-(1-Diethylcarbamoyl-4-piperazinyl)-ethyl]-3-(1,4-dimethylpentyl)-2-imidazolidinone hydrochloride;
M.p.: 179° to 182° C.

1-[2-(1-Diethylcarbamoyl-4-piperazinyl)-ethyl]-3-tert.-butyl-2-imidazolidinone hydrochloride;
M.p.: 207° to 212° C.

1-[2-(1-Diisopropylcarbamoyl-4-piperazinyl)-ethyl]-3-n-tetradecyl-2-imidazolidinone hydrochloride;
M.p.: 217° to 219° C.

EXAMPLE 4

1-[2-(2-Diethylcarbamoyl-4-piperazinyl)-ethyl]-3-n-dodecyl-2-imidazolidinone

This base is obtained as described in Example 3 from 1-n-dodecylimidazolidone-(2), ethylene oxide, piperazine or mono-N-carbethoxypiperazine, and diethylcarbamic acid chloride, and in the last step of the process from 15.8 g. (0.05 mole) of 1-n-dodecyl-3-($\beta$-chloroethyl)-imidazolidone-(2), 9.3 g. (0.05 mole) of N-diethylcarbamoyl piperazine and 5.1 g. (0.05 mole) of triethylamine in 50 cc. of dioxane. Yield: 22 g. (94.4 % of the theoretical) of the crude base.

The corresponding hydrochloride is obtained by treating 21.9 g. (0.04 mole) of the crude base with ethereal hydrochloric acid until a weakly acid reaction is obtained as described in Example 3. The resulting product is recrystallized from 600 cc. of ethyl acetate. M.p.: 165° to 168° C. Yield: 16 g. (67 % of the theoretical).

EXAMPLE 5

1-[2-(1-Diethylcarbamoyl-4-piperazinyl)-ethyl]-3-n-decyl-2-imidazolidinone

This base is obtained in the last reaction step as described in Example 3 from 14.4 g. (0.05 mole) of 1-n-decyl-3-($\beta$-chloroethyl)-imidazolidone-(2), 9.3 g. (0.05 mole) of N-diethylcarbamoyl piperazine and 5.1 g. (0.05 mole) of triethylamine in 50 cc. of dioxane. Yield: 21 g. (95.9 % of the theoretical) of the crude base. The intermediary products have been produced by the described first and second reaction steps.

The corresponding hydrochloride is obtained by treating 21.0 g. of the crude base with ethereal hydrochloric acid until a weakly acid reaction is obtained as described in Example 3. The product is recrystallized from 600 cc. of ethanol. M.p.: 167° to 169° C. Yield: 15 g. (65.8 % of the theoretical).

EXAMPLE 6

1-[2-(1-Diethylcarbamoyl-4-piperazinyl)-ethyl]-3-n-hexadecyl-2-imidazolidinone

This base is obtained in the last reaction step as described in Example 3 from 18.6 g. (0.05 mole) of 1-n-hexadecyl-3-($\beta$-chloroethyl)-imidazolidone-(2), 9.3 g. (0.05 mole) of N-dimethylcarbamoyl)-piperazine and 5.1 g. (0.05 mole) of triethylamine in 50 cc. of dioxane. Yield: 20 g. of a soapy solid crude base (76.6 % of the theoretical).

The corresponding hydrochloride is obtained by treating 19.8 g. of the crude base with ethereal hydrochloric acid as described in Example 3. The product is recrystallized from ethyl acetate. M.p.: 160° to 164° C. Yield: 14 g. (66.0 % of the theoretical).

EXAMPLE 7

1-[2-(1-Di-n-propylcarbamoyl-4-piperazinyl)-ethyl]-3-n-tetradecyl-2-imidazolidinone This base is obtained in the last reaction step as described in Example 3 from 17.2 g. (0.05 mole) of 1-n-tetradecyl-3-($\beta$-chloroethyl)-imidazolidone-(2), 10.7 g. (0.05 mole) of N-di-n-propylcarbamoyl piperazine and 5.1 g. (0.05 mole) of triethylamine in 50 cc. of dioxane. Yield: 25 g. of the oily crude base (95.7 % of the theoretical).

The corresponding hydrochloride of the above base is obtained by treating 25 g. of the crude base with ethereal hydrochloric acid as described in Example 3. The product is recrystallized twice from ethyl acetate. M.p.: 131° to 136° C. Yield: 9 g. (33.6 % of the theoretical).

EXAMPLE 8

1-[2-(1-Diethylcarbamoyl-4-piperazinyl)-ethyl]-3-methyl-2-imidazolidinone hydrochloride 3-Methyl-imidazolidone-(2) dissolved in methanol are treated with ethylene oxide. The methanol solvent is distilled off. The residue is dissolved in chloroform and gaseous HCl is introduced until saturation. The resulting solution is treated with an equivalent amount of thionyl chloride and the mixture finally is heated to reflux for 2 hours. Thereafter, chloroform is distilled off and the remaining residue is further reacted with N-carbethoxy-piperazine as described in Example 2a.

15 g. of 1-[2-(1-piperazinyl)-ethyl]-3-methyl-2-imidazolidinone thus obtained are dissolved in 100 cc. of acetone and 9.59 g. of diethylcarbamic acid chloride are added thereto and the mixture is refluxed for 6 hours. Upon cooling the final product precipitates as hydrochloride. The product is filtered off with suction and is recrystallized from acetone for further purification. M.p.: 184° to 185° C. Yield: 12.5 g. (51 % of the theoretical).

EXAMPLE 9

1-[2-(1-Diethylcarbamoyl-4-piperazinyl)-ethyl]-3-n-hexyl-2-imidazolidinone

This base is obtained in the last reaction step according to Example 3 from 11.6 g. (0.05 mole) of 1-n-hexyl-3-($\beta$-chloroethyl)-imidazolidine-(2), 9.3 g. (0.05 mole) of N-diethylcarbamoyl piperazine and 5.1 g. (0.05 mole) of triethylamine in 50 cc. of dioxane. Yield: 18 g. of the oily crude base (94.2 % of the theoretical).

The corresponding hydrochloride is obtained by treating 17.6 g. (0.046 mole) of the crude base with ethereal hydrochloric acid as described in Example 3. The thus obtained hydrochloride is recrystallized from about 600 cc. of ethyl acetate. M.p.: 176° to 179° C. Yield: 11 g. (57.2 % of the theoretical).

EXAMPLE 10

1-[2-(1-Diethylcarbamoyl-4-piperazinyl)-ethyl]-3-n-octyl-2-imidazolidinone

This base is obtained in the last reaction step as described in Example 3 from 13.0 g. (0.05 mole) of 1-n-octyl-3-(β-chloroethyl)imidazolidone-(2), 9.3 g. (0.05 mole) of N-diethylcarbamoyl piperazine and 5.1 g. (0.05 mole) of triethylamine in 50 cc. of dioxane. Yield: 18.5 g. of the oily crude base (90.2 % of the theoretical).

The corresponding hydrochloride is obtained by treating 18.5 g. (0.045 mole) of the above crude base with ethereal hydrochloric acid until a weakly acid reaction is obtained as described in Example 3. The product is recrystallized from about 600 cc. of ethyl acetate. M.p.: 173° to 176° C. Yield: 14 g. (69.6 % of the theoretical).

EXAMPLE 11

1-[3-(1-Diethylcarbamoyl-4-piperazinyl)-propyl[-3-methyl-perhydro-2-pyrimidinone 9.25 g. (0.05 mole) of diethylcarbamoyl piperazine (obtained according to Example 1a) are dissolved in 100 cc. of dioxane and 9.5 g. (0.05 mole) of 1-methyl-3-(γ-chloropropyl)hexahydropyrimidin-2-one and 5 g. (0.05 mole) of triethylamine are added thereto. The mixture is refluxed for 5 hours. After cooling the precipitated triethylamine hydrochloride is filtered off with suction and the dioxane is distilled off on a vapour bath. The residue is fractionated in a high vacuum. Thus, 13.5 g. (71.8 % of the theoretical) of 1-[3-(1-diethylcarbamoyl-4-piperazinyl)-propyl]-3-methyl-perhydro-2-pyrimidinone is obtained. B.p.$_{0.01\ mm}$: 185° to 190° C.

The corresponding hydrochloride is obtained as follows: 10 g. of the above base are dissolved in 250 cc. of anhydrous ether. The calculated amount of ethereal hydrochloric acid is added thereto with cooling. The precipitated hydrochloride is filtered off with suction and is dissolved in about 100 cc. of anhydrous acetone. This solution is evaporated to about half of its volume. The hydrochloride is precipitated by cooling in an ice-NaCl-mixture. It is filtered off with suction, the filter cake is washed with ether and the product is dried at 120° C. in a vacuum drying chamber. M.p.: 179° to 180° C.

EXAMPLE 12

1-[2-(1-Dimethylcarbamoyl-4-piperazinyl)-ethyl]-3-n-tetradecyl-2-imidazolidinone This product is obtained in the last reaction step as described in Example 3 from 17.2 g. (0.05 mole) of 1-n-tetradecyl-3-(β-chloroethyl-imidazolidinone-(2) (produced from 1-n-tetradecyl-imidazolidone and 1-chloro-2-bromo-ethane), 7.9 g. (0.05 mole) of N-dimethylcarbamoyl piperazine (produced from dimethylcarbamic acid chloride and mono-N-carbethoxy-piperazine and subsequent splitting off the carbethoxy group as described in Example 1a) and 5.1 g. (0.05 mole) of triethylamine in 50 cc. of dioxane. This product is converted into the hydrochloride as described in Example 3. M.p.: 145° to 148° C.

EXAMPLE 13 a. 1-Diethylcarbamoyl-4-β-chloroethyl-piperazine 37 g. (0.2 mole) of diethylcarbamoyl piperazine (produced according to Example 1a) are dissolved in 100 cc. of methanol and ethylene oxide are bubbled into the solution for 2 hours at room temperature. Thereafter, the methanol is distilled off on a vapour bath and the residue is fractionated in a high vacuum. B.p.$_{0.01\ mm}$: 130° to 135° C. Yield: 27 g.

23 g. (0.1 mole) of diethylcarbamoyl-4-β-hydroxyethyl-piperazine above obtained are dissolved in 150 cc. of chloroform and gaseous HCl is bubbled into the solution until saturation. Thus, the hydrochloride of the above base is obtained. 12 g. (0.1 mole) of thionylchloride are added thereto dropwise maintaining the temperature at about −5° C. Thereafter, the reaction mixture is heated to boiling for 2 hours. The chloroform is distilled off and the resulting 1-diethylcarbamoyl-4-β-chloroethyl-piperazine hydrochloride is further reacted without purification. The free base is obtained by treating the hydrochloride with cold concentrated soda lye, extracting the base with ether and evaporating the ether solvent.

b. 1-[2-(1-Diethylcarbamoyl-4-piperazinyl)-ethyl]-3-methyl-2-imidazolidinone 5 g. (0.05 mole) of N-methyl-imidazolidone-(2) are dissolved in 250 cc. of anhydrous dioxane and 2 g. (0.05 mole) of sodium amide are added thereto. The mixture is refluxed for 1 hour. Thereafter, the mixture is cooled and 11.7 g. (0.05 mole) of 1-diethylcarbamoyl-4-β-chloroethyl-piperazine are added thereto. The reaction mixture is refluxed for further 5 hours upon termination of the addition. The reaction mixture is cooled and the precipitated sodium chloride is filtered off with suction. The filtrate is evaporated in a vacuum on a steam bath. The remaining residue is dissolved in 200 cc. of anhydrous ether and the calculated amount of ethereal hydrochloric acid is added thereto with cooling. The precipitated hydrochloride is filtered off and is recrystallized from acetone containing a small amount of methanol. M.p.: 184° to 185° C. Yield: 2.5 g. (14.4 % of the theoretical).

M.p. of the maleinate: 106° to 110° C. (from ethyl acetate). M.p. of the citrate: 62° C. with formation of bubbles (from acetone/methanol 10:1).

EXAMPLE 14

1-[2-(1-Diethylcarbamoyl-4-perhydrodiazepinyl)-ethyl]-3-methyl-2-imidazolidinone hydrochloride The product is obtained in the last reaction step in accordance with Example 8 from 4.5 g. (0.02 mole) of 1-[2-(1-perhydrodiazepinyl)-ethyl]-3-methyl-2-imidazolidinone and 2.7 g. (0.02 mole) of diethylcarbamic acid chloride in 100 cc. of acetone. M.p.: 145° to 147° C. (from acetone containing a small amount of methanol). Yield: 3 g. (41.7 % of the theoretical).

The corresponding perhydrodiazocine derivative is produced in an analogous manner.

EXAMPLE 15

1-[2-(1-Piperidinocarbamoyl-4-piperazinyl)-ethyl]-3-n-tetradecyl-2-imidazolidinone This base is obtained in the last reaction step as described in Example 3 from 20.3 g. (0.1 mole) of piperidino-N-carbonylpiperazine, 34.4 g. (0.1 mole) of 1-n-tetradecyl-3-(β-chloroethyl)imidazolidone-(2) and 10.2 g. (0.1 mole) of triethylamine in 100 cc. of anhydrous dioxane. Yield: 45.8 g. (90.5 % of the theoretical) of the crude base.

The corresponding hydrochloride is obtained as described in Example 3. It is recrystallized from ethyl acetate containing a small amount of ethanol (30:1). M.p.: 185° to 187° C. (Yield: 70 % of the theoretical).

EXAMPLE 16

1-[2-(1-Hexamethyleneiminocarbonyl-4-piperazinyl)-ethyl]-3-n-tetradecyl-2-imidazolidinone This base is obtained in the last reaction step as described in Example 3 from 53.8 g. (0.25 mole) of hexamethyleneiminocarbonylpiperazine, 86.3 g. (0.25 mole) of 1-n-tetradecyl-3-($\beta$-chloroethyl)imidazolidone-(2) and 25.3 g. (0.25 mole) of triethylamine in 250 cc. of anhydrous dioxane. Yield: 107 g. (82.3 % of the theoretical) of the crude base. Upon recrystallization from petrolether the product melts at 46° to 48° C.

The corresponding hydrochloride is produced as described in Example 3 from 39 g. of the above base. It is recrystallized from acetone containing a small amount of ethanol (25:1). M.p.: 190° to 192° C. Yield: 35 g. (84 % of the theoretical).

EXAMPLE 17

1-[4-(1-Diethylcarbamoyl-4-piperazinyl)-butyl]-3-methyl-2-imidazolidinone

This base is obtained in the last reaction step as described in Example 3 from 5 g. (0.026 mole) of 1-methyl-3-(omega-chloro-n-butyl)-imidazolidone-(2), 4.7 g. (0.026 mole) of diethylcarbamoyl piperazine and 2.6 g. (0.026 mole) of triethylamine in 50 cc. of anhydrous dioxane.

B.p.: 190° to 195° C./0.01 mm. M.p. of the hydrochloride: 124° to 126° C.

EXAMPLE 18 a. 1-Diethylcarbamoyl-4-($\beta$-chloropropyl)-piperazine 22.25 g. (0.12 mole) of diethylcarbamoyl piperazine (obtained according to Example 1a) are dissolved in 150 cc. of methanol. 14.5 g. (0.25 mole) of 1.2-propyleneoxide are added thereto with cooling. The reaction mixture is allowed to stand over night. Thereafter, the alcohol is distilled off on a vapour bath. The residue is fractionated in a vacuum. B.p.$_{0.05\ mm}$: 130° to 135° C. Yield: 20 g.

19.5 g. (0.08 mole) of the thus obtained 1-diethylcarbamoyl-4-($\beta$-hydroxy-propyl)-piperazine are dissolved in 100 cc. of chloroform. 11.9 g. (0.01 mole) of thionylchloride are added to this solution slowly at room temperature. The mixture is refluxed for 3 hours after the addition is terminated. Thereafter, the chloroform is distilled off with heating on a steam bath. The resulting solid residue is recrystallized from acetone containing a small amount of methanol. M.p.: 145° to 147° C. The free base is obtained by adding concentrated soda lye to the hydrochloride, extracting with ether and evaporating the ether.

b. 1-[2-(1-Diethylcarbamoyl-4-piperazinyl)-1-methylethyl]-3-methyl-2-imidazolidinone 7 g. (0.07 mole) of 1-methyl-imidazolidone-2) are dissolved in 150 cc. of anhydrous dioxane. 3.1 g. (0.08 mole) of sodium amide are added thereto and the resulting mixture is refulxed for 2 hours. After cooling, 18.3 g. (0.07 mole) of 1-diethylcarbamoyl-4-($\beta$-chloropropyl)-piperazine are added thereto and the reaction mixture is further refluxed for 12 hours. The reaction mixture is cooled and the precipitated sodium chloride is filtered off with suction. The dioxane is distilled off and the remaining residue is fractionated in a high vacuum. B.p.$_{0.01\ mm}$: 180° to 182° C. Yield: 13 g.

The corresponding hydrochloride is obtained by dissolving the above base in anhydrous ether and adding thereto ethereal hydrochloric acid with cooling. The precipitated hydrochloride is filtered off with suction and is recrystallized from acetone. M.p.: 147° to 148° C.

EXAMPLE 19

1-<2-[1-(2-Pyrrolidone-N-carbonyl)-4-piperazinyl]-ether>-3-methyl-2-imidazolidinone 14.8 g. (0.1 mole) of 2-pyrrolidone-N-carboxylic acid chloride are dissolved in 20 cc. of anhydrous dioxane. This solution is added dropwise to a solution of 21.2 g. (0.1 mole) of 1-[2-(1-piperazinyl)ethyl]-3-methyl-2-imidazolidinone (produced as described in Example 2a by starting from 1-methyl-imidazolidone-(2) instead of 1-n-tetradecyl-imidazolidone-(2)) and 10.1 g. (0.1 mole) of triethylamine in 50 cc. of anhydrous dioxane with stirring and cooling. Thereafter, the reaction mixture is refluxed for 1 hour and is evaporated. The residue is dissolved in a small amount of water. The desired base is separated as an oil upon addition of concentrated soda lye. The oil is extracted twice with methylene chloride and the combined extracts are dried over sodium sulfate. Thus, 21 g. (65 % of the theoretical) of the crude base are obtained which is converted into the hydrochloride as described in Example 3. The hydrochloride is recrystallized from isopropanol. Yield: 13.5 g. (57.7 % of the theoretical). M.p. of the hydrochloride: 209° to 216° C.

EXAMPLE 20

1-[2-(1-Carbamoyl-4-piperazinyl)-ethyl]-3-methyl-2-imidazolidinone 13.7 g. (0.1 mole) of carbamic acid phenyl ester and 21.23 g. (0.1 mole) of 1-[2-(1-piperazinyl)-ethyl]-3-methyl-2-imidazolidinone (produced according to Example 19) are mixed with 100 cc. of distilled water and the mixture is stirred at room temperature for 2 hours and thereafter is refluxed for 2 hours. After cooling, the phenol is separated and the aqueous phase is evaporated. The oily residue solidifies upon scratching with ether. The solid product is filtered off and is recrystallized from ethyl acetate:methanol (50:1). Yield: 13 g. (50.9 % of the theoretical). M.p.: 140° to 142° C.

The corresponding hydrochloride is obtained as follows: 5 g. of the base are dissolved in 200 cc. of acetone and the calculated amount of ethereal hydrochloric acid is added thereto. The precipitated hydrochloride is filtered off with suction and is recrystallized from isopropanol. Yield: 4 g. M.p.: 170° C.

EXAMPLE 21

1-[2-(1-Monomethylcarbamoyl-4-piperazinyl)-ethyl]-3-methyl-2-imidazolidinone

A solution of 9.3 g. (0.1 mole) of N-monomethylcarbamic acid chloride in 50 cc. of anhydrous dioxane is added to a solution of 21.6 g. (0.1 mole) of 1-[2-(1-piperazinyl)-ethyl]-3-methyl-2-imidazolidinone (prepared according to Example 19) and 10.1 g. (0.1 mole) of triethylamine in 150 cc. of anhydrous dioxane dropwise with stirring and cooling. After the termination of the addition the reaction mixture is stirred for 1 hour at room temperature and for further 2 hours while refluxing. After cooling the precipitated triethylamine hydrochloride is filtered off with suction, the filter cake is washed with dioxane and the filtrate is evaporated. The residue is dissolved in a small amount of water and concentrated soda lye is added thereto until the oily separation of the base. The mixture is extracted twice with methylene chloride and the combined extracts are dried over sodium sulfate. The methylene chloride is separated in a vacuum. 27 g. of the crude base are obtained as residue which crystallizes after standing for some time. The product is recrystallized from ethyl acetate. Yield: 20 g. (74 % of the theoretical) of the base. M.p.: 111° to 112° C.

The corresponding hydrochloride is obtained as described in Example 20. M.p. of the hydrochloride: 179° to 182° C. (from ethyl acetate/methanol).

EXAMPLE 22

1-[2-(1-Di-n-butylcarbamoyl-4-piperazinyl)-ethyl]-3-methyl-2-imidazolidinone

This base is obtained in the last reaction step as described in Example 19 from equimolar amounts of di-n-butyl-carbamic acid chloride, 1-[2-(1-piperazinyl)-ethyl]-3-methyl-imidazolidinone and triethylamine in dioxane. M.p. of the hydrochloride: 112° to 114° C. (from ethyl acetate).

EXAMPLE 23

2-[2-(1-Methyl-2-oxo-imidazolidin-3-yl)-ethyl-amino]-ethyl urea 18.6 g. (0.1 mole) of N-[2-(1-methyl-2-oxo-imidazolidin-3-yl)-ethyl]ethylene diamine and 13.7 g. (0.1 mole) of carbamic acid phenyl ester are mixed. After standing for a short time the reaction starts with heating. For completing the reaction, the reaction mixture finally is heated for 15 minutes on a water bath. Thereafter, the mixture is diluted with about 100 cc. of water. Upon cooling the precipitated phenol is filtered off with suction. In order to remove remaining phenol, the filtrate is extracted with ether. It is then evaporated in a vacuum. Thus, 19 g. (82.9 % of the theoretical) of the crude base are obtained. For producing the maleinate, 5 g. of the above base are dissolved in 100 cc. of anhydrous acetone and a solution of an excess of maleic acid in anhydrous ether is added thereto. Upon standing over night a highly viscous product is precipitated. This product is triturated with isopropanol and thus solidifies. The solid maleinate is refluxed with ether for removing remaining maleic acid. The product is filtered off with suction and is recrystallized from a mixture of acetone and methanol. M.p.: 160° to 162° C.

The following products have been prepared correspondingly:
3-[2-(1-Methyl-2-oxo-imidazolidin-3-yl)-ethylamino]-propyl-urea. The melting point of the citrate: 113° to 115° C.
N-2-[2-(1-methyl-2-oxo-imidazolidin-3-yl)-ethyl-methyl-amino]-ethyl-N-methyl-urea. B.p.$_{0.01\ mm}$: 160° to 165° C.

EXAMPLE 24 a. 1-(2-Hydrazinoethyl)-3-methyl-2-imidazolidinone 80 g. of hydrazine hydrate (80 %; 2 mole) are added to a solution of 81 g. (0.5 mole) of 1-methyl-3-$\beta$-chloroethyl-imidazolidon-(2) in 300 cc. of methanol. The reaction mixture is refluxed for 5 hours. The methanol is separated in a vacuum. The remaining residue is dissolved in water and the base is precipitated as oil by adding concentrated soda lye to the aqueous solution. The oil is separated in a separating funnel and is dissolved in acetone. The solution is dried over anhydrous potassium carbonate and the acetone is evaporated. The remaining residue is extracted with ether. The combined ethereal extracts are evaporated and the remaining oil is fractionated in a high vacuum. B.p.$_{0.01\ mm}$: 140° to 145° C. $N_D^{17}$: 1.5080. Yield: 47 g.

b. 1-[2-(1.5-Diazacyclooct-1-yl)-ethyl]-3-methyl-2-imidazolidinone 40.2 g. (0.2 mole) of 1.3-dibromopropane and 21.2 g. (0.2 mole) of anhydrous sodium carbonate are added to a solution of 15.8 g. (0.1 mole) of 1-(2-hydrazinoethyl)-3-methyl-2-imidazolidinone in 200 cc. of ethanol. The mixture is refluxed for 8 hours. After cooling to about 0° C., the reaction mixture is filtered in order to separate insoluble salts and the filtrate is evaporated in a vacuum. The resulting residue is extracted with ether in order to separate neutral impurities soluble in ether. The remaining 1-[2-(1-methyl-2-oxo-imidazolidin-3-yl)-ethyl]-1.2-trimethylene pyrazolidinium bromide is further reacted as follows: 20 g. of chips of amalgamated aluminum and 250 cc. of ether are added to the product and a total of 40 cc. of water are added thereto in fractions with cooling. The reaction mixture is allowed to stand for about 48 hours while cooling to about 0° C. in the beginning is maintained. During this time the colour of the reaction mixture changes from brown to almost colourless. Thereafter, solid KOH is added to the reaction mixture in an excess while cooling at about 0° C. The organic phase is separated and the residue is extracted several times with ether. The combined ethereal extracts are evaporated and the residue is distilled in a vacuum. B.p.$_{0.01\ mm}$: 155° to 158° C. $n_D^{17}$: 1.5160. Yield: 7.5 g.

c. 1-[2-(1-Diethylcarbamoyl-1.5-diazacyclooct-5-yl)-ethyl]-3-methyl-2-imidazolidinone 4.1 g. (0.03 mole) of diethylcarbamic acid chloride are added to a solution of 7.2 g. (0.03 mole) of 1-[2-(1.5-diaza-cyclooct-1-yl)-ethyl]-3-methyl-2-imidazolidinone and 3 g. (0.03 mole) of triethylamine in 100 cc. of acetone with cooling. Thereafter, the reaction mixture is heated on a steam bath for 2 hours. The precipitated triethylamine hydrochloride is filtered off with suction and the filtrate is evaporated in a vacuum. The remaining residue is dissolved in a small amount of water and concentrated soda lye is added thereto. The separated oil is dissolved in ether, the ethereal solution is dried over potassium carbonate and is evaporated. The remaining oil is distilled in a high vacuum. B.p.$_{0.01\ mm}$: 195° to 198° C. Yield: 6 g.

EXAMPLE 25 a. p-Toluene sulfonic acid ester of 1-($\beta$-hydroxyethyl-3-methyl-2-imidazolidinone 46.8 g. (0.2 mole) of toluene sulfonyl chloride and 28.8 g. (0.2 mole) of 1-($\beta$-hydroxyethyl)-3-methyl-2-imidazolidinone- (prepared from equivalent amounts of 1-methyl-imidazolidone-(2) and ethylene oxide) are dissolved in 100 cc. of chloroform and 35 g. (0.35 mole) of triethylamine are added thereto dropwise. The temperature rises from room temperature to 30° C. Stirring is continued until the separation of crystals starts and the mixture becomes pulpy. The separated crystals are filtered off with suction, the filtrate is reduced in volume and mixed with 150 cc. of benzene and the resulting mixture is extracted with 150 cc. of water. The benzene layer is dried over sodium sulfate and again reduced in volume. Upon cooling a product crystallizes which may be recrystallized from a mixture of 80 cc. of ether and 5 cc. of acetone. Upon cooling in an ice-box the desired final compound crystallizes. M.p.: 53° to 55° C. Yield: 22.4 g.

b. 1-[2-(1-Diethylcarbamoyl-4-piperazinyl)-ethyl]-3-methyl-2-imidazolidinone 15 g. (0.05 mole) of the p-toluene sulfonic acid ester of 1-(β-hydroxyethyl)-3-methyl-2-imidazolidinone prepared as above described and 9 g. (0.05 mole) of diethylcarbamoyl piperazine prepared as described in Example 1a are heated to boiling in 30 cc. of toluene for about 6 hours. Upon standing and cooling over night, soft brownish-yellow crystals precipitate which turn solid and flake-like upon the addition of 100 cc. of ether. The crystals are filtered off with suction and are washed with 50 cc. of ether. Thereafter, the product is treated with 70 cc. of 5 N soda lye and the resulting mixture is extracted with 100 cc. of benzene. The benzene layer is separated, dried over sodium sulfate and the solvent is evaporated in a rotating evaporator. The residue is fractionated in a high vacuum. The main fraction distills between 169° and 174° C. at 0.004 mm. Yield: 7 g. (about 44.9 % of the theoretical).

EXAMPLE 26

1-[2-(1-Diethylcarbamoyl-2,5-dimethyl-4-piperazinyl)-ethyl]-3-methyl-2-imidazolidinone 10.7 g. (0.05 mole) of N-diethylcarbamoyl-2,5-dimethyl-piperazine (prepared in an analogous manner as described in Example 1a), 8.1 g. (0.05 mole) of 1-methyl-3-(β-chloroethyl)-imidazolidone-(2) (prepared from equivalent amounts of 1-methyl-imidazolidone-(2) and 1-chloro-2-bromo-ethane), 5.1 g. (0.05 mole) of triethylamine and 50 cc. of anhydrous dioxane are refluxed for 15 hours. The separated triethylamine hydrochloride is filtered off with suction from the cooled reaction mixture, the filter cake is washed with dioxane and the filtrate is evaporated. The residue is dissolved in a small volume of water and concentrated soda lye is added until separation of an oil. This oil is separated, dissolved in methylene chloride and the solution is dried over sodium sulfate and evaporated. Yield: 16.7 g. (98.2 % of the theoretical) of the crude base.

The hydrochloride is prepared by dissolving 16.6 g. (0.049 mole) of the crude base in anhydrous ether and ethereal hydrochloric acid is added thereto with stirring and cooling until a weakly acid reaction. The ether is poured off from the precipitated, partially oily hydrochloride and the salt is recrystallized twice from acetone. M.p.: 171° to 176° C.

EXAMPLE 27

1-[2-(1-Diethylcarbamoyl-4-piperazinyl)-ethyl]-3-n-octadecyl-2-imidazolidinone

This base is obtained in the last reaction step as described in Example 1 from 20.1 g. (0.05 mole) of 1-n-octadecyl-3-(β-chloroethyl)-imidazolidone-(2), 9 g. (0.05 mole) of n-diethylcarbamoyl piperazine and 5.1 g. (0.05 mole) of triethylamine in 50 cc. of dioxane. Yield: 21.8 g. of the crude base.

The corresponding hydrochloride has a melting point at 165° to 167° C. It has been recrystallized from a 20:1-mixture of ethyl acetate and methanol. Yield: 44.8 % of the theoretical.

EXAMPLE 28: TABLETS

| | 1 kernel contains: |
|---|---|
| 1-[2-(1-Diethylcarbamoyl-4-piperazinyl)-ethyl]-3-n-tetradecyl-2-imidazolidinone-hydrochloride | 5.370 mg. |
| corn starch | 36.200 mg. |
| lactose | 27.500 mg. |
| sec. calcium phosphate, anhydrous | 25.510 mg. |
| gelatine | 1.420 mg. |
| talcum | 3.000 mg. |
| magnesium stearate | 1.000 mg. |
| | 100.000 mg. |

The corn starch, lactose and calcium phosphate are passed through a 1 mm. sieve, are homogeneously mixed and moistened by means of a 4 % aqueous gelatine solution. The resulting mixture is passed through a 2 mm. sieve and dried until a relative humidity of 45 % (measured by means of a sample hygrometer). The resulting product and the active compound, talcum and magnesium stearate are passed through a 0.75 mm. sieve and thereafter are homogeneously mixed. The product which now is ready for pressing, is pressed to kernels having a diameter of 6 mm., a camber radius of 5 mm. and a weight of 100 mg. each. The kernels are checked in the control laboratory for mistakes. Thereafter, they are coated in a usual way with 3 mg. each of a coating consisting of cellulose derivatives, softening agents and colour pigments.

EXAMPLE 29: INJECTION SOLUTION

| | | 1 cc. contains: |
|---|---|---|
| Active compound as in Example 28 | | 10.738 mg. |
| ethanol per analysis | | 12.200 mg. |
| 1 N soda lye | about | 0.007 cc. |
| aqua pro injectione | up to total vol. of | 1.000 cc. |

The active compound (which corresponds to about 10 mg. of the base) is dissolved in the ethanol and 99 % of the volume of water. The pH is rendered to 4.8 by the addition of 1 N soda lye (about 0.007 cc. are necessary per each cc. of injection solution). Finally, the volume is adjusted by the addition of aqua pro injectione. The solution then is filtered through a steril Seitz-EKS-filter under aseptic conditions and under nitrogen and the solution then is filled into white ampullas under aseptic conditions and under nitrogen. The ampule containing 5.3 cc. of solution contains 50 mg. of active compound while an ampule containing 10.5 cc. of the solution contains 100 mg. of active compound.

EXAMPLE 30: CREAM

| | 100 g. of cream contains: |
|---|---|
| Active compound as in Example 28 | 0.011 g. |
| protegine | 50.000 g. |
| sorbitol 70 % | 4.000 g. |
| distilled water | 45.989 g. |
| | 100.000 g. |

The protegine is heated to 60° C. The active compound is dissolved in water and the sorbitol solution and the resulting solution is heated to 60° C. This heated solution is added to the molten protegine with thorough stirring and in portions. The addition is withheld after each portion until the previous portion has been thoroughly mixed. The resulting emulsion is passed through a homogenizing apparatus running at high speed and thereafter is cooled with stirring to about 30° C. The product finally is passed through an ointment homogenizer. The resulting cream contains the active compound in an amount corresponding to 0.01 % of the base.

EXAMPLE 31: LOTION 100 g. of the lotion contains:
| | |
|---|---|
| Active compound as in Example 28 | 0.032 g. |
| titanium dioxide | 20.000 g. |
| talcum | 20.000 g. |
| aerosil 200 | 1.000 g. |
| kalium sorbate | 0.100 g. |
| glycerine | 29.434 g. |
| distilled water | 29.434 g. |
| | 100.000 g. |

The titanium dioxide, talcum and aerosil are mixed homogeneously and then mixed with the glycerine. The resulting pasty product is passed over an ointment homogenizer and brought to the final product by slowly adding a solution of the active compound and of the potassium sorbate in water thereto. The lotion contains the active compound in an amount corresponding to 0.03 % of the base.

EXAMPLE 32: EYE OINTMENT 1.0 g. of the ointment contains:
| | |
|---|---|
| Base of the active salt compound of Example 28 | 0.3 mg. |
| eucerine anhydricum | 200.0 mg. |
| semiliquid paraffine | 299.7 mg. |
| vaselinum album | 500.0 mg. |
| | 1000.0 mg. |

The eucerine, paraffine and vaselinum are molten together and sterilized in a drying oven by heating for 3 hours at 140°C. Thereafter, the active compound base is mixed into the ointment under aseptic conditions. The final ointment contains 0.03 % of the active base.

EXAMPLE 33: POWDER 1 g. of powder contains:
| | |
|---|---|
| Base of the active salt compound of Example 28 | 0.3 mg. |
| magnesium oxide | 5.0 mg. |
| ANM-powder base product | 994.7 mg. |
| | 1000.0 mg. |

200 parts of the powder base product are homogeneously moistened with a 1.5 % solution of the active base in isopropanol. Thereafter, the compound is dried until the complete evaporation of the isopropanol. The magnesium oxide and the remaining amount of the powder base product are added, the mixture is passed through a 0.1 mm. sieve and is homogeneously mixed. The powder contains 0.03 % of the active base.

What we claim is:

1. A compound having the formula $$R_2\text{-}N(R_3)\text{-}CO\text{-}N(R_4)\text{-}B\text{-}N(R_5)\text{-}R\text{-}N\underset{(CH_2)_m}{\overset{CO}{\diagdown\diagup}}N\text{-}R_1$$

wherein $m$ is 2 or 3, R is a member selected from the group consisting of the straight and branched alkylene groups having from 2 to 4 carbon atoms, $R_1$ is a member selected from the group consisting of the straight and branched alkyl and alkenyl groups having from 1 to 18 carbon atoms, $R_2$ and $R_3$, which may be identical or different from each other, represent members selected from the group consisting of hydrogen and the lower alkyl groups having from 1 to 4 carbon atoms and, $R_2$ and $R_3$ together represents a polymethylene chain having 5 or 6 carbon atoms, B is a polymethylene chain having from 2 to 3 carbon atoms and $R_4$ and $R_5$ are members selected from the group consisting of hydrogen and the lower alkyl groups having from 1 to 4 carbon atoms and $R_4$ and $R_5$ together represent a polymethylene chain having from 2 to 3 carbon atoms, and the salts of these compounds with pharmacologically acceptable acids.

2. A compound according to claim 1 wherein $m$ is 2, $R_1$ is an alkyl group having from 1 to 18 carbon atoms, $R_2$ and $R_3$ each represent a lower alkyl group, B is an ethylene group and $R_4$ and $R_5$ together represent a member selected from the group consisting of the ethylene and propylene groups.

3. A compound according to claim 1 wherein $m$ is 2 or 3, $R_1$ is an alkyl group having from 1 to 18 carbon atoms, $R_2$ and $R_3$ each represent lower alkyl groups, B is an ethylene group and $R_4$ and $R_5$ together represent an ethylene group.

4. 1-[2-(1-Diethylcarbamoyl-4-piperazinyl)-ethyl]-3-n-tetradecyl-2-imidazolidinone and its salts with pharmacologically acceptable acids.

5. A compound in accordance with claim 4 in which the salt is the hydrochloride.

* * * * *

UNITED STATES PATENT OFFICE
CERTIFICATE OF CORRECTION

PATENT NO. : 3,919,233
DATED : November 11, 1975
INVENTOR(S) : Rolf Rebling, Klaus Pressler and Jurgen Potel It is certified that error appears in the above-identified patent and that said Letters Patent are hereby corrected as shown below:

Column 2, line 39, after the word "formula", insert --VI--.

Column 4, line 29, "and" should read --or--.

Column 8, line 6, "ester" should read --ether--.

Column 9, line 67, "dimethylcarbamoyl" should read --diethylcarbamoyl--.

Column 10, line 54, "imidazolidine" should read --imidazolidone--.

Column 11, line 51, "imidazolidinone" should read --imidazolidone--.

Column 13, line 58, "refulxed" should read --refluxed--.

Signed and Sealed this ninth Day of March 1976

[SEAL]

Attest:

RUTH C. MASON
*Attesting Officer*

C. MARSHALL DANN
*Commissioner of Patents and Trademarks*